Nov. 17, 1970 G. L. WALTHER 3,541,270
MAGNETIC READ/WRITE HEAD WHICH SENSES DATA TRACK LATERAL ALIGNMENT ERROR
Filed March 7, 1967
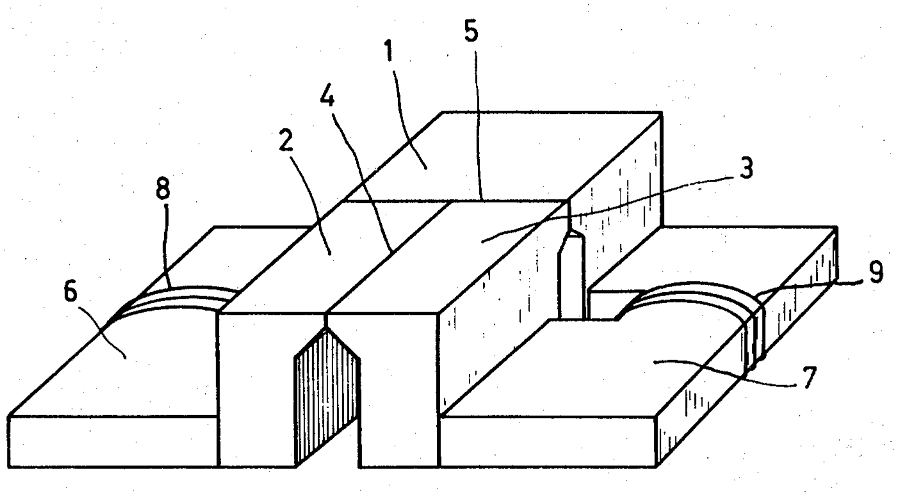
INVENTOR.
GEORGE L. WALTHER
BY
Frank R. Sinfoni
AGENT United States Patent Office 3,541,270

Patented Nov. 17, 1970

3,541,270

MAGNETIC READ/WRITE HEAD WHICH SENSES DATA TRACK LATERAL ALIGNMENT ERROR

George Ludwig Walther, Emmasingel, Eindhoven, Netherlands, assignor, by mesne assignments, to U.S. Philips Corporation, New York, N.Y., a corporation of Delaware Filed Mar. 7, 1967, Ser. No. 621,240
Claims priority, application Netherlands, Mar. 9, 1966, 6603051
Int. Cl. G11b *5/26, 5/28*
U.S. Cl. 179—100.2 3 Claims

ABSTRACT OF THE DISCLOSURE

A magnetic transducing head for recording or reproducing and for detecting positional error relative to a track on a record carrier having movement in the direction of travel of the recording track carrier said magnetic head having two pole pieces, one of which is divided into two magnetically insulated portions, each portion being connected by a separate yoke, each yoke having a coil coupled thereto. By comparison of the voltages induced in the coils during the adjustment of a head to a track, any positional error may be directly detected. Once correctly adjusted to the track, the head may be used as a conventional writing or reading head across a full track width.

This invention relates to a magnetic transducing head and more particularly to a magnetic transducing head construction which will provide for correct head orientation relative to a track bearing record carrier having movement relative to the head. Modern recording techniques demand a high degree of head to track correlation accuracy, particularly in multi-track recording wherein a high track density is a prerequisite. A prime factor in obtaining high track density on a record carrier is the maintainance of tracks in a continuously parallel relationship. To this end, the associated heads concerned should be accurately oriented relative to the tracks, which means that the axis of symmetry of the tracks should invariably pass through the center of the useful gap in the head. To the degree that the latter condition is not satisfied, the induced voltage during playback will be deleteriously affected. Moreover, interference voltages may be realized in reading information written at the side of the track to be reproduced and in extreme cases when erasing, information of adjacent tracks may also be erased.

Orientation inaccuracy is a frequent occurrence under such conditions as temperature fluctuation, affecting the position of the head relative to the carrier, and relatively poor mechanical tolerances resulting in inaccuracies in the head position adjusting mechanism. One proposed system for providing accurate head to track orientation is in the provision of reference tracks, provided one on each side of the main track. These reference tracks are scanned by checking heads positioned on either side of the main head and a comparison between the voltages induced in each of the checking heads will provide an indication of head to the track orientation. A departure from proper head to track position may readily be ascertained with respect to value and direction as a result of the compared voltages. A serious drawback to the use of reference tracks is that useful parts of the recording surface are sacrificed.

It is therefore more advantageous to determine the correct position of a head to a track by using a signal written in the track itself rather than the use of reference signal tracks. To this end magnetic heads have been provided with two auxiliary checking heads, the useful gaps of which are located on either side in front of and behind the main gap as opposed to being located on either side of the main gap. These gaps are positioned symmetrically with regard to the center of the main gap and each cover an edge of the track. If the main gap is correctly positioned with respect to the track and the magnetization in the track is constant, the voltages induced in each of the side checking heads will be equal to one another, thereby indicating proper orientation. However, the foregoing adjusting mechanism construction suffers from in that two auxiliary heads are required in addition to the main head.

It is accordingly a prime object of this invention to provide a magnetic recording head construction which will enable positional errors between the head and the track of a record carrier to be detected with a satisfactory degree of accuracy.

It is a further object of this invention to provide a magnetic head construction which will detect positional errors with regard to relative positioning of head to recording track without sacrificing recording space on the record carrier.

It is a still further object of the invention to provide a magnetic recording head construction which will detect positional errors without the need for providing auxiliary heads.

In obviation of the foregoing disadvantages, the present invention provides a magnetic head having at least one pole piece divided in the direction of travel of the carrier into two magnetically insulated portions. Each of the portions are connected by means of a separate yoke to the non-divided pole piece. A coil is provided on each of the yokes to allow a voltage representative of head position to be generated.

This head construction thus consists effectively of two heads each covering a portion of the track width. It is not necessary for the portions into which the pole piece has been divided to be accurately equal to each other, as differences between the circuits associated with different halves of the track may be compensated electrically in a known manner.

By relative comparison of the two voltages induced in each of the yoke coils during the adjustment of the head to the track, any positional error may be directly detected. The amplitude of the difference signal thus detected is a measure of positional error, whereas the phase of the difference signal will indicate the direction of deviation of the head from the track.

The foregoing advantages and objects and description will become more apparent with reference to the drawing and the following description which illustrate and describe respectively the preferred embodiment of the head in accordance with the invention.

Referring to the figure, a magnetic transducing head composed of a suitable magnetic transducing material such as a ferrite is formed by a pole piece portion 1 having an end surface 1A and a pole piece divided into two portions 2 and 3, each having end surfaces 2A and 3A along an axis paralleling the direction of travel of a record carrier relative to the head. The two portions 2 and 3 are magnetically insulated from one another by means of a suitable non-magnetic material 4, composed of glass, enamel, and the like. The two pole pieces 1 and 2, 3 are separated by a useful gap 5, which may be formed by any of the known methods. The magnetic circuit of the head is closed by means of two yokes 6 and 7, each composed of a suitable magnetic material such as a ferrite, and each having coils 8 and 9, respectively associated therewith. Each of the coils 8 and 9 form the checking circuits for position error determination with proper tracking, when the main gap 5 is centered over the primary track, voltages induced in each of the coils 8 and 9 may be compared with each other for providing a fixed reference indicating correspondence between the main gap and the track. Deviation from this fixed reference will then be indicative of a lack of correspondence; a positional error. In operation, the coils 8 and 9 will provide a transduced signal indicative of positional error between head and track. If the reluctances of the circuits formed by parts 1–2–6–1 and 1–3–7–1 respectively are equal, the voltages induced in coils 8 and 9 will similarly be equal. If the reluctances of the circuits are not equal, as a result for example of the difference in dimensions of corresponding portions, electrical compensation is required in order to permit effective comparison between the induced voltages. In any event establishment of a reference voltage indicating proper tracking through the comparison of the voltages induced in coils 8 and 9 may be used in any known manner to indicate correspondence between head and track or lack of correspondence between head and track.

The resultant difference signal thus described may also be utilized for detecting a phenomenon known as dropout, caused by imperfections of the magnetizable layer of the carrier, or other defects or transients imposed upon the recording system. Adjustments made several times by means of records in one track and to repeatedly renewed records in the same track may, in the presence of systematic errors, gradually change the position of the head relative to the carrier. When a fixed test record is used, this "drift" may be avoided.

Once correctly adjusted to the track, the head in accordance with the invention may be used as a conventional writing, reading, erasing head across a full track width. This may be accomplished simply by altering the polarity of one of the checking circuits.

It is understood that the specific embodiment of the invention described herein is merely illustrative and that other arrangements according to the principles of this invention may be devised by one skilled in the art without departing from the spirit and scope of the invention.

What is claimed is:

1. A magnetic head including, a useful gap for recording or reproducing signals with respect to a track bearing record carrier, said head also detecting positional error with respect to said track bearing record carrier, said carrier having movement relative to said head, said head comprising a first pole piece and a second pole piece, said pole pieces having end surfaces each defining and being separated by said useful gap, non-magnetic means dividing the first of said pole pieces including the useful gap defining end surface, in the direction of said relative carrier movement, into first and second portions, magnetic means respectively coupling each of said first and second portions to the second of said pole pieces to form first and second magnetic circuits, and electrical means coupled to each of said magnetic selectively operative in a first arrangement for together deriving from said first and second magnetic circuits a difference signal indicative of positional error and in a second arrangement for together recording or reproducing signals across said useful gap.

2. The magnetic transducing head of claim 1 wherein said first and second magnetic means comprises respectively a first yoke connecting said first portion to said second pole piece and a second yoke connecting said second portion to said second pole piece.

3. A magnetic head including a useful gap for recording or reproducing signal with respect to a track bearing record carrier, said head also detecting positional error with respect to said track bearing record carrier, said carrier having movement relative to said head, said head comprising a first pole piece and a second pole piece, said pole pieces having end surfaces each defining and being separated by said useful gap, non-magnetic means dividing the first of said pole pieces including the useful gap defining end surface, in the direction of said relative carrier movement, into first and second portions, a first yoke connecting said first portion to said second pole piece and a second yoke connecting said second portion to said second pole piece, a first winding coupled to said first yoke and a second winding coupled to said second yoke and electrical means coupled to each of said first and second windings, said electrical means selectively operative in a first arrangement for together deriving from said first and second windings a difference signal indicative of positional error and in a second arrangement for together recording or reproducing signals across said useful gap.

References Cited

UNITED STATES PATENTS

| | | | |
|---|---|---|---|
| 2,785,038 | 3/1957 | Ferber | 170—100.2 |
| 3,124,803 | 3/1964 | Homan | 179—100.2 |
| 3,240,881 | 3/1966 | Oliver | 179—100.2 |
| 3,246,307 | 4/1966 | Stanley | 179—100.2 |
| 3,353,168 | 11/1967 | Poumakis | 179—100.2 |
| 3,357,005 | 12/1967 | Geurst et al. | 179—100.2 |

FOREIGN PATENTS

| | | |
|---|---|---|
| 1,372,256 | 8/1964 | France. |

BERNARD KONICK, Primary Examiner

R. S. TUPPER, Assistant Examiner

PO-1050
(5/69)

UNITED STATES PATENT OFFICE
CERTIFICATE OF CORRECTION

Patent No. 3,541,270 Dated November 17, 1970

Inventor(s) GEORGE LUDWIG WALTHER

It is certified that error appears in the above-identified patent and that said Letters Patent are hereby corrected as shown below:

Claim 1, line 15, after "magnetic" insert --circuit said electrical means--

Signed and sealed this 22nd day of August 1972.

(SEAL)
Attest:

EDWARD M.FLETCHER,JR.
Attesting Officer

ROBERT GOTTSCHALK
Commissioner of Pat